US 6,621,069 B2

(12) United States Patent
Holzapfel et al.

(10) Patent No.: US 6,621,069 B2
(45) Date of Patent: Sep. 16, 2003

(54) OPTICAL ENCODER WITH AN ELECTRIC FIELD—SCREENING GRIT

(75) Inventors: Wolfgang Holzapfel, Obing (DE); Walter Huber, Traunstein (DE); Sebastian Tondorf, Waging am See (DE); Peter Pechak, Stein/Traun (DE); Herbert Mauerberger, Traunstein (DE); Franz Obermaier, Trostberg (DE); Josef Höhentinger, Truchtlaching (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/901,322

(22) Filed: Jul. 9, 2001

(65) Prior Publication Data

US 2002/0005477 A1 Jan. 17, 2002

(30) Foreign Application Priority Data

Jul. 10, 2000 (DE) ........................... 100 33 263

(51) Int. Cl.[7] ................................. G01D 5/34
(52) U.S. Cl. ............................ 250/231.14; 250/237 G; 356/498
(58) Field of Search ................. 250/231.14, 231.13, 250/231.16, 237 G, 237 R; 356/498, 499, 614–618; 33/706, 707

(56) References Cited

U.S. PATENT DOCUMENTS

| 4,906,838 A | | 3/1990 | Sogabe et al. |
| 5,030,825 A | * | 7/1991 | Ikeuchi ................. 250/231.14 |
| 5,283,434 A | * | 2/1994 | Ishizuka et al. ........ 250/237 G |
| 5,534,693 A | * | 7/1996 | Kondo et al. ........... 250/237 G |
| 5,630,283 A | * | 5/1997 | Nelle .......................... 33/702 |
| 5,670,781 A | | 9/1997 | Setbacken |
| 5,742,391 A | * | 4/1998 | Kaneda et al. .............. 356/499 |
| 5,856,668 A | * | 1/1999 | Nelle et al. ............ 250/231.13 |
| 6,154,278 A | * | 11/2000 | Ito et al. ................. 250/237 G |
| 6,163,970 A | * | 12/2000 | Nelle et al. .................... 33/482 |

FOREIGN PATENT DOCUMENTS

DE       4402554       3/1995

* cited by examiner

Primary Examiner—Kevin Pyo
Assistant Examiner—Seung C. Sohn
(74) Attorney, Agent, or Firm—Sidley Austin Brown & Wood, LLP

(57) ABSTRACT

An optical encoder including a scale, a scanning device displaceable relatively to the scale in a measuring direction and having a scanning reticle with at least one transparent window limited by an opaque screen and a partial grit formed of an electrically conductive material and provided at least in a region of the window.

12 Claims, 3 Drawing Sheets

OPTICAL ENCODER WITH AN ELECTRIC FIELD— SCREENING GRIT

BACKGROUND OF THE INVENTION

1. Field of the Invention

The present invention relates to an optical encoder with a scale optically scanned by a scanning device.

2. Description of the Prior Act

Such encoders are particularly used with machine-tools for measuring the relative movement of a tool with respect to a machined workpiece, and with coordinate-measuring machines. Upon this use of the encoders, the encoders are subjected to action of electrical fields, in particular parasitic electrical alternating fields which influence the operation of the scanning device and cause generation of electrical disturbance signals and, as a result, erroneous position determination.

There are known different measures that were undertaken to shield the particularly interference-prone sensor elements of the scanning device from the electrical fields.

According to European Patent Publication EP 0328661 B1 from which the present invention proceeds, the sensor elements are located in a grounded housing. The housing is covered with a transparent scanning reticle in front of the light-sensitive surfaces of the sensor elements. A scanning pattern, which is formed of an opaque, electrically conductive material and which also grounded, is provided of the scanning reticle. The scanning pattern limits transparent windows which are arranged in predetermined phase positions for generating phase-shifted, relative to each other, electrical scanning signals. These measures result in an adequate screening only when the scanning pattern has sufficiently small windows.

In order to achieve a complete screening, German Patent DE 44 02 554 suggests to screen the light-sensitive region of the sensor elements with a transparent screen member which is formed of an electrically conductive material and is grounded. It is suggested to use, as a screen member, a transparent foil provided with a transparent conductive layer. The layer can be formed of thin metal layers or conductive metal oxide (ITO) layers. It is also suggested to form a scanning pattern on such a screen member or to secure thereto a scanning reticle.

The drawback of this measure consists in that such screen member has only a relatively small light transmission (about 85%).

Accordingly, an object of the present invention is to provide an optical encoder having a high interference resistance against electrical fields, in particular, parasitic electrical fields.

Another object of the present invention is to provide an optical encoder with screening means that would disturb the optical beam path in the encoder as little as possible.

SUMMARY OF THE INVENTION

These and other objects of the present invention, which will become apparent hereinafter, are achieved by providing an optical encoder of the type described above in which a scanning device, which is displaceable relatively to the scale in a measuring direction, has a scanning reticle with at least one transparent window limited by an opaque screen and a partial grit formed of an electrically conductive material and provided at least in region of the window.

The foregoing novel features of the present invention permit to achieve good screening of the light-sensitive sensor, with a minimal distortion of the optical beam path.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
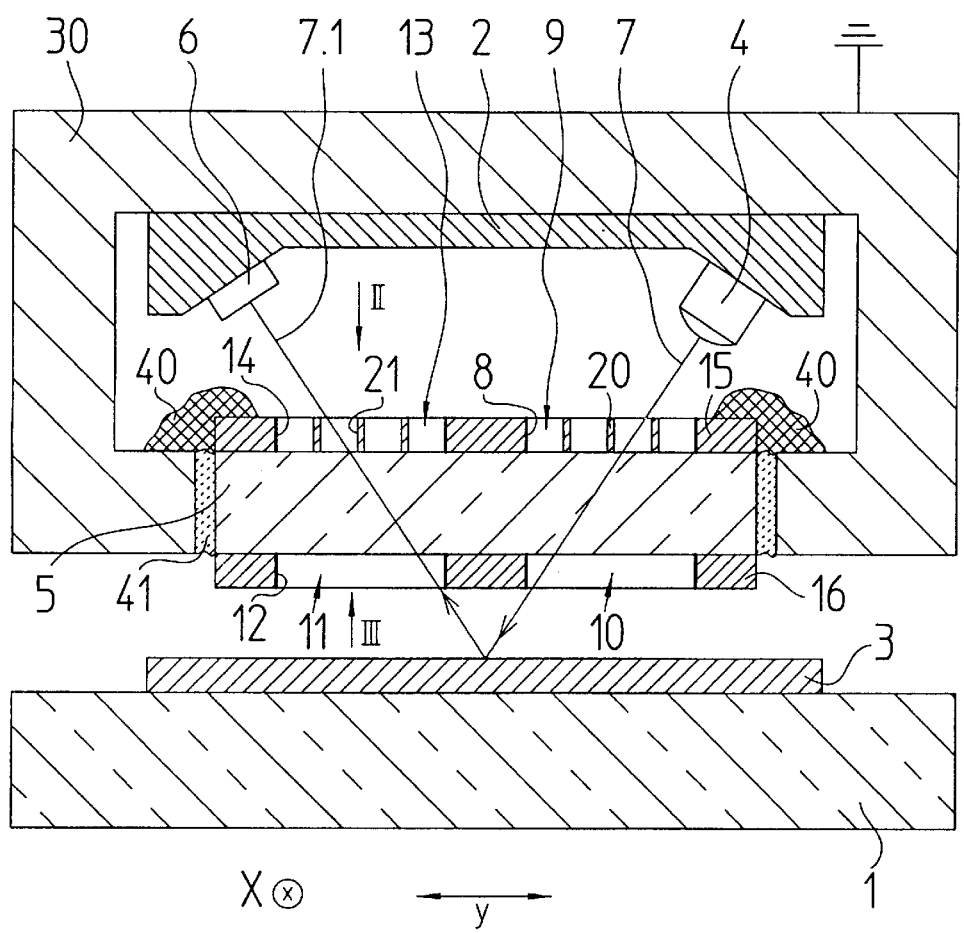
FIG. 1 a cross-sectional view of a linear encoder.

FIG. 1 shows a cross-sectional view of an optical incremental linear encoder taken transverse to the measuring direction X. The linear encoder consists, in per se known manner, of a scale 1 displaceable relative to a scanning device 2 in the measuring direction X. The scale 1 has a reflecting graduation 3 which is scanned by the scanning device 2. The scanning device 2 includes a light source 4 the light of which is collimated by a transparent scanning reticle 5, falls on the scale 1, is reflected from the graduation 3, and strikes, through the scanning reticle 5, a sensor 6 of the scanning device 2.

A light beam 7, which is emitted from the light source 4, is constrained, upon striking the scanning reticle 5, by a screen 8. The light beam 7 passes through a first window 9, which is limited by the screen 8, and falls on a scanning grating which consists of alternating, arranged side-by-side, opaque region 10.1 and transparent region 10.2. The scanning grating 10 serves for forming a plurality of separate beams 7.1 which interact with the graduation 3 and strike the sensor 6 for generating position-dependent, relative to each other phase-shifted, scanning signals. The transparent regions 10.2 of the scanning gratin 10 represent bar-shaped windows having a width in X-direction of several :m (from 1:m to 20:m) and a length in the Y-direction of several mm. A partial beam 7.1, which is reflected from the graduation, passes through a second window 11 of the scanning reticle 5 which is limited by an opaque screen 12, and a third window 13 of the scanning reticle 5 which is likewise limited by an opaque screen 14.

Figure 2:
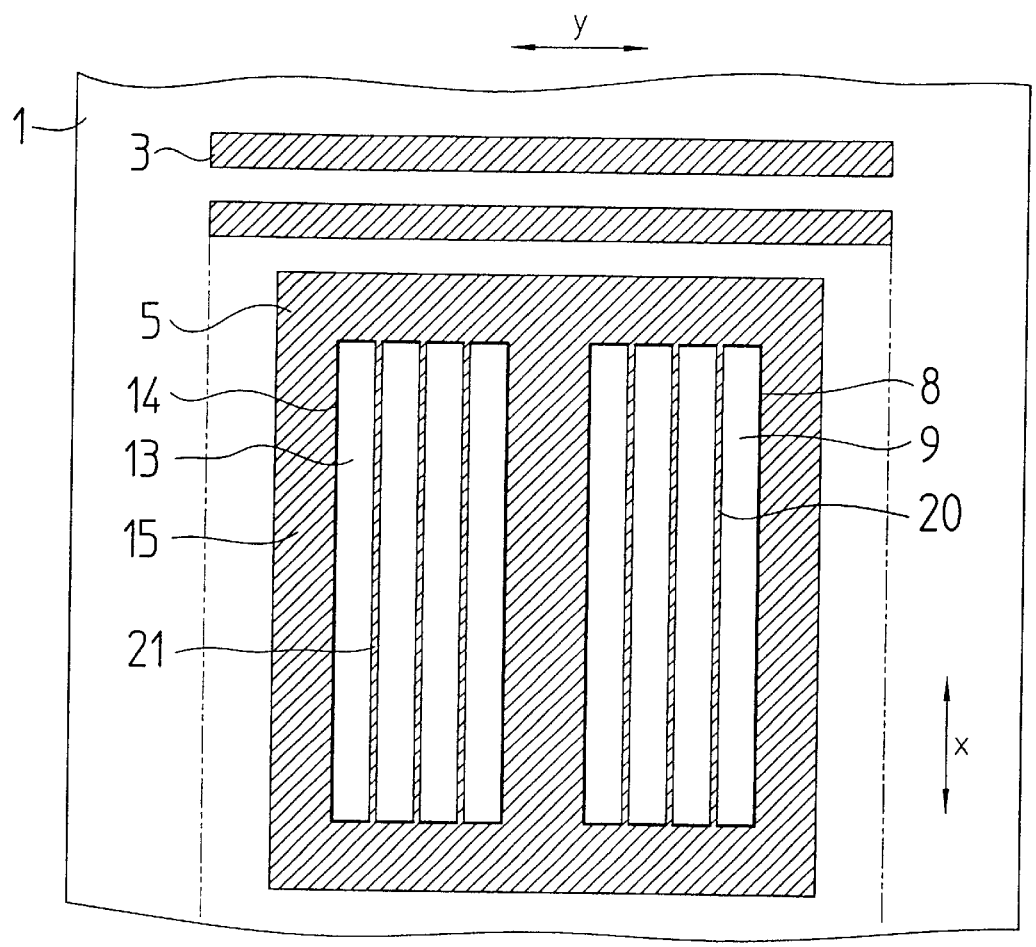
FIG. 2 a top view of the scanning reticle of the linear encoder shown in FIG. 1.

The opaque screen 8 of the first window 9 and the opaque screen 14 of the third window 13 are formed by an opaque layer 15 of an electrically conductive material formed on the surface of the scanning reticle 5. A plan view of the layer 15 with the windows 9 and 13 is shown in FIG. 2.

Figure 3:
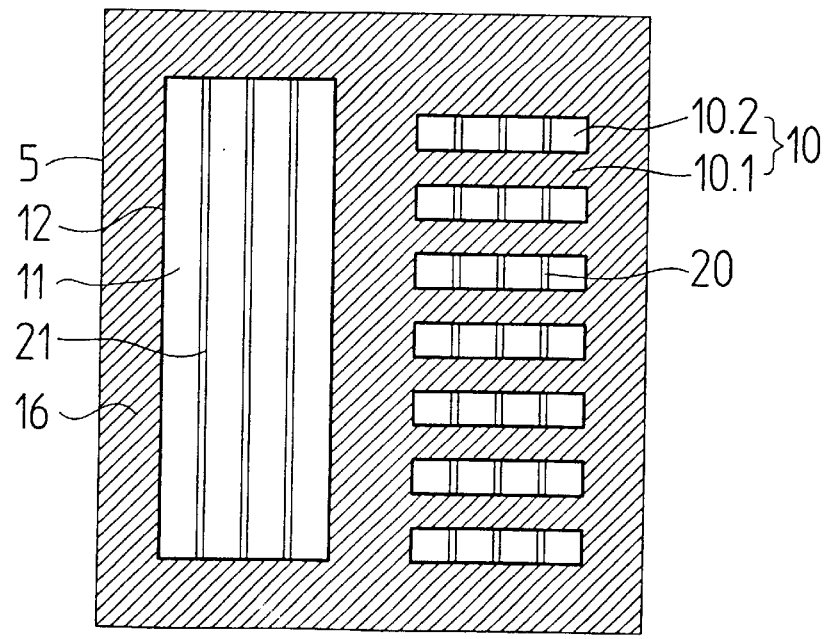
FIG. 3 a bottom view of the scanning reticle of the linear encoder shown in FIG. 1.

The opaque regions 10.1 of the scanning grating 10 and the opaque screen 12 of the second window 11 are provided on the surface of the scanning reticle 5 which lies directly opposite the graduation 3, and are formed by an opaque layer 16 of an electrically conductive material. The plan view of this layer is shown in FIG. 3.

The transparent scanning reticle 5 is formed of an electrically nonconductive material, as a rule, of glass, so that the electrical alternating fields can reach the sensors 6 through the windows 9, 11, 13, and 10.2 in form of an electrical parasitic radiation.

For screening the electrical fields, a grit 20 of an electrically conductive material is partially formed in the window 9. The grit 20 is formed of thin lines or webs which cross the transparent regions 10.2 of the scanning grating 10. The grit 20 is shown in FIG. 2 only schematically.

In order to distinguish the screen 8, which is limited by the beam path 7, and the grit 20, the screen 8 is shown with thicker lines than the grit 20. In practice, it is advantageous, when the grit 20 is formed of the same material as the layer 15 so that they can be deposited by a common coating process.

Likewise, a grit 21 of an electrically conductive material is partially formed in the opening by the windows 11 and 13. The grit 21 is also formed as a component of the layer 15 in form of webs extending transverse to the to-be-reflected graduation 3 and the opaque regions 10.2 of the scanning grating 10.

Advantageously, the partial grits 20 and 21 consist of webs having a width of several :m, in particular less than 10:m, and spaced from each other by a distance exceeding in many times their width, in particular, in a region of from 100:m to 500:m. With the width, e.g., of 5:m and the pacing of 160:m, the transmission loss of the light beam 7 during single passing lies in a region of about 3%. Thus, the measures according to the invention permitted to achieve a good screening, with minimal transmission losses.

The partial grits 20 and 21 in the light beam paths 7 and 7.1 are so formed that no noticeable position-dependent modulation of the light beam takes place. It is particularly advantageous when the linear grits 20 and 21 extend in the measuring direction X, i.e., transverse to the action of the scanning grating 10 for forming separate beams 7.1.

Instead of the straight-line grits 20,21, other partial grits formed of an electrically conductive material in form of wave lines, in form of a grit with crossing each other lines, or in form of a transparent dot pattern can be provided. If the grits are particularly small or thin, they only slightly affect the beam path. A particularly good screening is achieved when separate lines, webs, or pattern elements of a partial structure are electrically connected with each other.

The scanning reticle is secured in the housing 30, e.g., with glue 41. The layer 15, which forms the partial grits 20,21 and the screens 8 and 14, forms, with the housing 30 of an electrically conductive material, a Faraday cage in which at least the sensors 6 of electrical components of the scanning device 2 are located. Also, the partial grits 20, 21 and the screens 8,14, i.e., the layer 15, are electrically connected with the housing 30. This connection can be affected with an electrically conductive glue or by soldering. The screening can be further increased by grounding the housing 30.

In optical encoders, the scanning distance, i.e., the distance between the scanning grating 10 and the graduation 3 is extremely small. In this space, it is difficult to form a contact of the layer 16 with the housing 30. Because of this, it is advantageous when for screening, not the surface of the scanning reticle 5 which lies directly opposite the scale 1, but rather the surface with the layer 15, which lies directly opposite the sensor 6, is used. At this location, as a rule, there is sufficient place for forming an electrical connection between the housing 30 and the layer 15.

Figure 4:
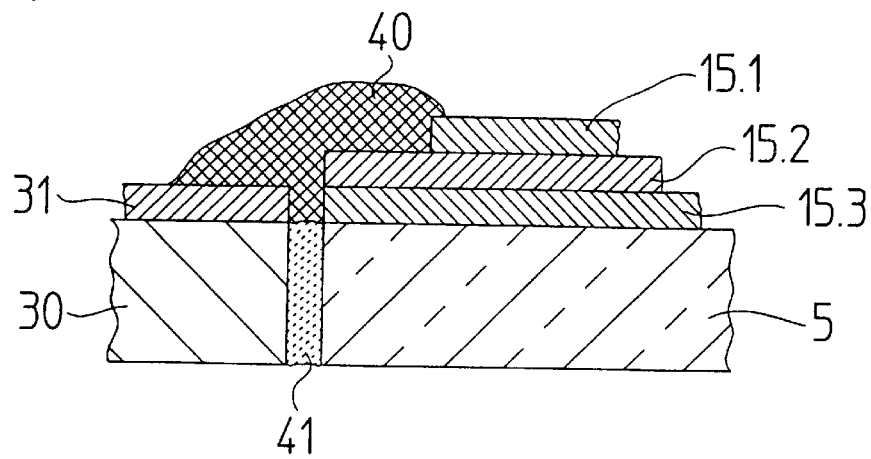
FIG. 4 a partial cross-sectional view of a bonding location of a scanning reticle.

The electrically conductive layer 15 is, e.g., formed of chromium. To prevent reflection, the layer 15 is often formed as a stack of layers where the uppermost layer is a blooming, non-conductive layer formed, e.g., of chromium oxide. An example is shown in FIG. 4. A layer, which is designated in FIG. 1 with a reference numeral 15, is formed as a stack of three layers 15.1, 15.2, and 15.3. Of these layers, only the middle layer is formed of an electrically conductive material. For electrically bonding of the layer 15.2 with the housing 30, the layer 15.2 is exposed, whereas the uppermost layer 15.1 is partially removed, particular, by etching or with a laser.

When the housing 30 is formed of a non-electrical by conductive material, advantageously, the Faraday cage is obtained by coating the housing with an electrically conductive material. Then, the electrically conductive layer 15 or 15.2 is bonded with the electrically conductive layer 31 of the housing 30 by glue 40, as it is schematically shown in FIG. 4.

Figure 5:
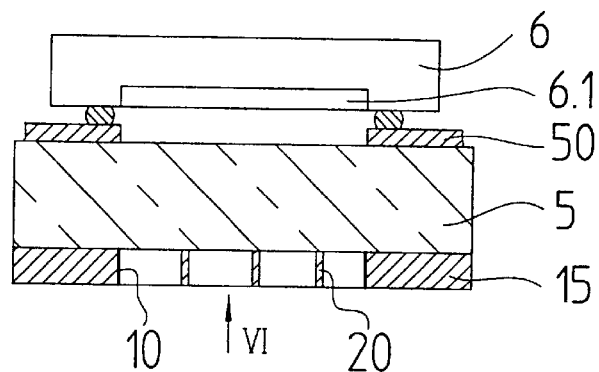
FIG. 5 a cross-sectional view along line V—V in FIG. 6 of a scanning device.
Figure 6:
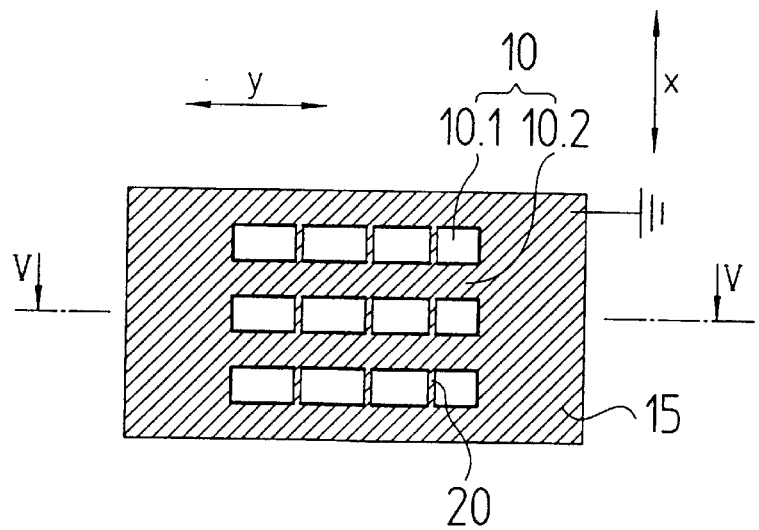
FIG. 6 a view in direction of arrow VI in FIG. 5.

FIGS. 5 and 6 show another embodiment. The transparent scanning reticle 5 carries on one of its surfaces, as in the embodiment according to FIGS. 1–3, a scanning grating 10 with opaque regions 10.1 and transparent regions 10.2. The transparent regions 10.2 are formed as bar shaped windows having a width in the X-direction of several $\mu$m (1 $\mu$m–20 $\mu$m) and a length in X-direction of several $\mu$m. If the opaque regions 10.1 of scanning grating 10 consist of an electrically conductive material, the electrical fields having a direction parallel to longitudinal expansion (in this embodiment, y-direction) can reach the sensor 6 through the transparent regions 10.2.

Therefore, partially, a structure 20, which is formed of webs extending transverse to the extent of the bar-shaped openings 10.2, is provided in the windows 10.2, with the structure 20 forming, together with opaque regions 10.2, an electrically conductive and grounded layer 15 for screening. In this embodiment, the scanning reticle 5 simultaneously forms a carrier for the sensor 6 the light-sensitive surface area 6.1 of which is located adjacent to the scanning grating 10. On the surface of the scanning reticle 5, there are provided strip conductors in form of an electrically conductive layer 50 which the sensor 6 contacts via bumps. This contact of the scanning reticle 5 is described, e.g., in U.S. Pat. No. 5,670,781. From the manufacturing point of view, it is particularly advantageous when in a manner not shown, the strip conductor 50, the opaque regions 10.1 of the scanning grating 10, and the transparent window 10.2 of the scanning grating 10, and the partial grit 20 are formed together on a surface of the scanning reticle 5 as a common layer.

If in the shown embodiments, the opaque layer 15 for limiting the windows 9,13 and/or 10.2 should be formed of an electrically non-conductive material, the electrically conductive partial grits 20,21 can also be formed in the opaque regions of a surface of the scanning reticle 5.

The scanning grating can also be formed as a phase grid, with the partial grits 20,21 being provided directly on or beneath this phase grid.

In the drawings, the sensor 6 is shown only schematically. The sensor 6 has, as a rule, several light-sensitive regions. The sensor 6, however, can be formed of several discrete sensor elements.

The present invention can find application in both rotary and linear encoders.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. An optical encoder, comprising:

a scale;

a scanning device displaceable relatively to the scale in a measuring direction and having a scanning reticle with at least one transparent window, and an opaque screen for limiting the transparent window, and a partial grit formed of an electrically conductive material and provided in the transparent window for screening electrical fields.

2. An encoder according to claim 1, wherein the opaque screen together with the partial grit is provided on a surface of e scanning reticle in a form of a common continuous layer formed of an electrically conductive material.

3. An optical encoder according to claim 1, wherein the partial grit is formed of extending parallel to each other and in a me suing direction, thin lines.

4. An optical encoder according to claim 3, wherein the webs are spaced from each other by a distance exceeding a web width in tens of times.

5. An optical encoder according to claim 1, wherein the scanning device comprises a sensor, and an electrically conductive housing the opening of which is covered by the scanning reticle, and wherein the partial grit is grounded.

6. An optical encoder according to claim 1, wherein the partial grit is grounded.

7. An optical encoder according to claim 5, wherein the scanning reticle has a first surface located directly opposite the scale, and a second surface adjacent to the sensor, and wherein the partial grit is formed on the second surface.

8. An optical encoder according to claim 7, wherein the transparent window is provided on the first surface, and wherein the transparent window forms a scanning grating having arranged next to each other, in the measuring direction, alternating opaque regions and transparent regions.

9. An optical encoder, comprising:

a scale;

a scanning device displaceable relatively to the scale in a measuring direction and having a scanning reticle formed of a transparent material and having a window for passing a scanning light; and surface texture formed of an electrically conductive material on the scanning reticle in the window for screening electrical fields.

10. An optical encode according to claim 9, wherein the scanning device further comprises an electrically conductive housing having an opening which is covered by the scanning reticle, and wherein the surface texture is electrically connected with the housing.

11. An optical encoder according to claim 9, wherein surface texture is formed of extending parallel to each other and in a measuring direction, thin lines.

12. An optical encoder according to claim 11, wherein the webs are spaced from each other by a distance of at least ten times a web width.

* * * * *